United States Patent
Hsu et al.

(10) Patent No.: US 8,943,355 B2
(45) Date of Patent: Jan. 27, 2015

(54) CLOUD DATA STORAGE SYSTEM

(75) Inventors: Wen-Feng Hsu, Taoyuan (TW);
Kuo-Heng Lo, Kaohsiung (TW);
Shyan-Ming Yuan, Hsinchu (TW);
Hung-Ming Chien, Hsinchu (TW);
Ying-Tse Kuo, Hsinchu (TW);
Cheng-Yi Huang, Hsinchu (TW)

(73) Assignee: Promise Technology, Inc., Hsin-Chu (TW)

( * ) Notice: Subject to any disclaimer, the term of this patent is extended or adjusted under 35 U.S.C. 154(b) by 131 days.

(21) Appl. No.: 13/608,053

(22) Filed: Sep. 10, 2012

(65) Prior Publication Data
US 2013/0151884 A1 Jun. 13, 2013

(30) Foreign Application Priority Data
Dec. 9, 2011 (TW) .............................. 100145438 A

(51) Int. Cl.
*G06F 11/00* (2006.01)
(52) U.S. Cl.
USPC ............................................. 714/4.11
(58) Field of Classification Search
CPC ................................. G06F 11/20; G06F 17/30
USPC ....................................................... 714/4.11
See application file for complete search history.

(56) References Cited

U.S. PATENT DOCUMENTS

| | | | |
|---|---|---|---|
| 7,181,480 B1 * | 2/2007 | Nikiel et al. ........................... 1/1 |
| 8,533,231 B2 * | 9/2013 | Aizman et al. ................ 707/793 |
| 8,595,546 B2 * | 11/2013 | Dalton ........................... 714/4.1 |
| 8,819,476 B2 * | 8/2014 | Roth et al. ........................ 714/1 |
| 8,862,928 B2 * | 10/2014 | Xavier et al. ................. 714/4.11 |
| 2007/0083572 A1 * | 4/2007 | Bland et al. .................... 707/204 |
| 2011/0161294 A1 * | 6/2011 | Vengerov et al. .............. 707/637 |
| 2011/0161723 A1 * | 6/2011 | Taleck et al. ................. 714/4.11 |
| 2012/0054325 A1 * | 3/2012 | Backa ........................... 709/223 |
| 2012/0084548 A1 * | 4/2012 | Cheng et al. ...................... 713/2 |
| 2012/0265758 A1 * | 10/2012 | Han et al. ....................... 707/737 |
| 2013/0111262 A1 * | 5/2013 | Taylor et al. ................. 714/4.11 |
| 2013/0204948 A1 * | 8/2013 | Zeyliger et al. ............... 709/206 |
| 2013/0304694 A1 * | 11/2013 | Barreto et al. ................ 707/608 |
| 2013/0311586 A1 * | 11/2013 | Anand et al. .................. 709/206 |

(Continued)

OTHER PUBLICATIONS http://www.slideshare.net/KonstantinVShvachko/hdfs-design-principles HDFS Design Principles by Konstantin V. Shvachko on Apr. 27, 2013 (This is a weblink no document is associated with it).*

(Continued)

*Primary Examiner* — Amine Riad
(74) *Attorney, Agent, or Firm* — Thomas | Horstemeyer, LLP

(57) ABSTRACT

A cloud data storage system is provided for multiple clients to access data of files comprising at least one node connecting to a first storage means; at least one namenode module for processing file operations issued from the clients, namenode module issuing data access instructions to access and maintain the metadata on the first storage means; at least one datanode module respectively executing on at least one node, each datanode module functioning to scan and access a second storage means connected thereto; at least one data import module selectively executing on nodes in which datanode module are executing, the data import module scanning a second storage means newly connected to the cloud data storage system and obtaining a corresponding metadata, and executing data migration operation for the data in second storage means without actual physical uploading operation.

5 Claims, 9 Drawing Sheets

(56) References Cited

U.S. PATENT DOCUMENTS

Figure 1:
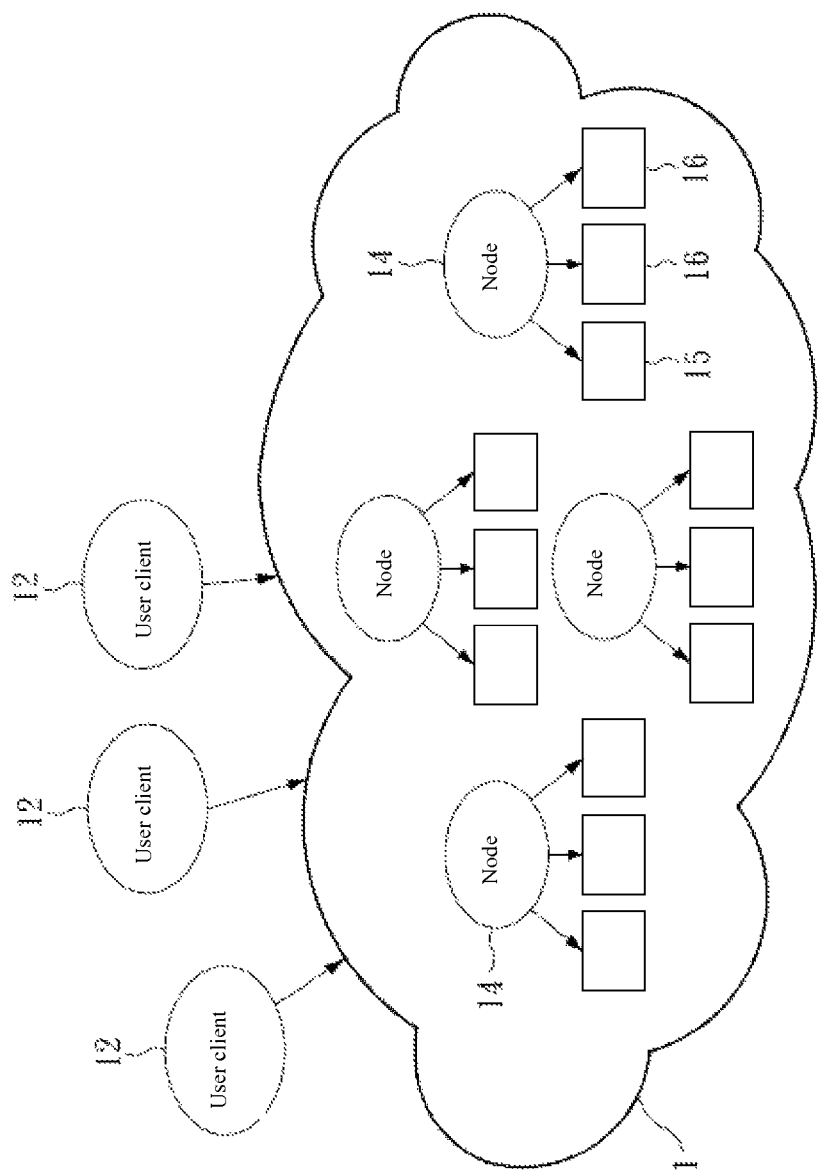

| | | | |
|---|---|---|---|
| 2014/0019405 A1* | 1/2014 | Borthakur et al. | 707/609 |
| 2014/0019495 A1* | 1/2014 | Borthakur et al. | 707/827 |
| 2014/0040575 A1* | 2/2014 | Horn | 711/162 |
| 2014/0047342 A1* | 2/2014 | Breternitz et al. | 715/735 |
| 2014/0059226 A1* | 2/2014 | Messerli et al. | 709/226 |
| 2014/0081927 A1* | 3/2014 | Lipcon et al. | 707/692 |
| 2014/0108639 A1* | 4/2014 | Nelke et al. | 709/224 |
| 2014/0108648 A1* | 4/2014 | Nelke et al. | 709/224 |
| 2014/0281702 A1* | 9/2014 | Venkata | 714/15 |

OTHER PUBLICATIONS

Giacinto Donvito, Overview of the new technologies and evolution of storage systems for handling large volume of data, super r&d workshop ferrara 2010.* http://wiki.apache.org/hadoop/FrontPage.*

* cited by examiner

CLOUD DATA STORAGE SYSTEM

CROSS-REFERENCE TO RELATED APPLICATION

This utility application claims priority to Taiwan application serial number 100145438, filed Dec. 9, 2011, which is incorporated herein by reference.

BACKGROUND OF THE INVENTION

1. Field of the Invention

This present invention relates to a cloud data storage system, and in particular to a cloud data storage system with capability of data import and cell recovery.

2. Description of the Prior Art

The data storage system has evolved from local harddisk, Redundant Array of Independent Disks (RAID), central file server in local area network (LAN), network attached storage (NAS), storage area network (SAN) and clustered storage apparatus of earlier times to the cloud storage apparatus. With the high speed development of Internet technology and mobile devices, e.g., iPHONE, iPAD, data storage has moved into the "cloud" era. People intend to visit cloud data storage system or to obtain computational capability at any places where they can log on the Internet. People usually own their local independent standalone storage system and computation device and on the other hands from their PC or personal mobile devices visit the clustered storage to access data of files on any storage apparatus within Internet cloud system.

The centralized file server uses basic client/server network technology to resolve issue of data retrieval. In its simplest form, a file server is employed, which might be PC or workstation hardware executing network operating system (NOS), to support controlled (or different access privilege levels) files sharing (e.g., Novell NetWare, UNIX® or Microsoft Windows®). The file server could provide gigabytes of storage capacity with hard disks or with tape drives that further expand the storage capacity.

To set up cloud data storage system, clustered or cloud files system such as Hadoop File System (HDFS) appeared. In general, these clustered files system consists of metadata server node and plural data nodes. The metadata server node provides file attributes data, such as file size, access control flags and location of file. The data node provides data access service of actual (or, in other term, preliminary) data to user clients. However, to small office home office (SOHO) environment, if they like to have their own cloud data storage system, the cost for clustered cloud data storage system of this type is too expensive. The following is the summary of the current technologies.

Lustre Clustered Files System

Lustre is an open source codes clustered files system proposed by Sun Microsystem Co. (merged by Oracle Co.). Lustre metadata management architecture is a typical master-slave architecture. The active metadata server (MDS) serves the request of metadata inquiry, and the standby (non-active) MDS, to assure failover during any accident of malfunctions, will monitor health of the active MDS.

To provide high availability of metadata services, Lustre permits plural MDSs operating at standby mode for meeting fail-over needs. All MDSs are all connected to metadata target (MDT), but only the active MDS may access MDT. Although other MDSs provide failover mechanism of malfunctions, the computational capabilities of standby MDSs are therefore wasted. The single active MDS is a bottleneck to the entire clustered files system. The overall cost for the clustered cloud data storage system of this type is too high.

Hadoop Clustered Files System (HDFS)

HDFS is an open source cloud files system proposed by Hadoop project. HDFS implements namenode to service metadata inquiry requests from all clients. The metadata update log (EDITLOG) record all metadata editing request messages and is stored on the harddisk storage apparatus of master namenode. The secondary namenode rapidly merges the metadata from EDITLOG into files system structure image file (FsImage) of namenode's harddisk. A new metadata update log (EDITLOG_new) is created for coming update requests during the merging process. After the merge process is done, the old EDITLOG will be deleted and then EDITLOG_new will be renamed to EDITLOG.

HDFS is a distributed, scalable and portable files system written in Java language directed to Hadoop architecture. Under the Hadoop architecture, each node in general has a single datanode, and the clustered plural datanodes constitute HDFS clustered files system. But it not required for each node within HDFS cloud files system to have datanode. Each datanode provides data_block access service over the network using block protocol specific to HDFS. HDFS uses TCP/IP layer for communication purpose, and user_clients use RomoteProcedureCall to communicate with each other. HDFS can replicate data across different platforms of datanode, and therefore there is no need for RAID type harddisk on the datanode.

The current HDFS does not have failover mechanism during malfunctions. Once the namenode malfunctions, the administrator must reset the namenode. Once the harddisk of namenode malfunctions, EDITLOG and FsImage metadata will be lost. The secondary namenode wastes its server computational capability since it only executes the check point mechanism.

Filesystem update recording files and metadata Editlog record all filesystem operations for the namenode. As some files are deleted or new files are added into the system, these operation records will be recorded into EDITLOG which can be stored on the local disk of the namenode, and the contents recorded including operation timestamps, file metadata and additional information. The contents of EDITLOG are merged into FsImage periodically. At the moment of each merging, FsImage includes metadata for all files of the system, the metadata contents includes the file owners, file access privileges, the numbering of file_blocks and the datanode where the file block resides.

Ceph Metadata Servers Clustered Architecture

There are five different types of metadata management architecture. According to literature, HDFS and Lustre belong to types of metadata being separated from the actual data, and Ceph belongs to metadata server clustered architecture and adopts subtree partitioning algorithm. The number of subdirectory limits the amount of metadata server used, and as the number of subdirectory grows to a certain number, this method is not enough.

However, since data servers used in above mentioned architectures are type of the standard data file server (i.e., central file servers), instead of standard network attached storage apparatus (NAS), several drawbacks exist. First of all, the clients have to use specific user_client for accessing files or data from the data server, making operations difficult for general publics without specific trainings. Secondly, hardware, infrastructure or operational costs of these standard file servers are higher than the standard NAS. Thirdly, the management works for standard file server is higher than that of standard NAS.

SUMMARY OF THE INVENTION

In accordance with one aspect of the invention, the cloud data storage system provided is a low cost, scalable, and flexible cloud data storage system.

The technical issues to be resolved are high efficient data migration and data cell recovery.

In this invention, a novel metadata management architecture using namenode module, datanode module and NAS is set up for scalable and flexible cloud data storage system. Since NAS costs lower than standard server, it is an option for smaller companies or SOHO environment to establish their own cloud data storage system (private cloud).

In order to add capability of high efficient data migration, embodiment of the cloud data storage system for plural user_clients access data of plural files over cloud data storage system, comprising one to plural nodes, each node being adapted to connect to a first storage apparatus, for storing metadata of each file and being adapted to connect to an second storage apparatus for storing files; at least one namenode module, for processing file operations issued from user_client, the namenode module issuing data access instruction to access and maintain metadata on the first storage apparatus; at least one datanode module, being respectively executed on one to plural nodes, each datanode module functioning to scan and access an second storage apparatus connected thereto; one to plural data import modules, being selectively executed on node over which a datanode module is executed, the data import module functioning to scan a second storage apparatus newly connected to the cloud data storage system and obtain a corresponding file metadata, and perform data migration operation on the second storage apparatus without performing data uploading.

In order to add capability of cell recovery, embodiment of the cloud data storage system, which permits plural user_clients to access data of plural files over the cloud data storage system, comprising one to plural nodes, each node being adapted to connect to a first storage apparatus, for storing metadata of each files and being adapted to connect to a second storage apparatus for storing files; at least two namenode modules, said two namenode modules including an active namenode module and plural inactive namenode modules, the active namenode module being executed on one of nodes, for processing file operations issued from the user_client, active namenode module issuing data access instruction to access and maintain metadata on the first storage apparatus; at least one datanode module, being respectively executed on one to plural nodes, each datanode module functioning to scan and access a second storage apparatus connected thereto; one to plural namenode monitor module, being respectively executed on one to plural nodes, for monitoring health status of active namenode module, and as active namenode module malfunctions, wake up inactive namenode module.

More details of the respective embodiments can be found in the respective iterations in the dependent claims hereinafter recited.

All aspects of the present invention will no doubt become apparent to those of ordinary skills in the art after reading the following detailed description of the preferred embodiment, which is illustrated in the following figures and drawings.

BRIEF DESCRIPTION OF THE APPENDED DRAWINGS

Figure 2:
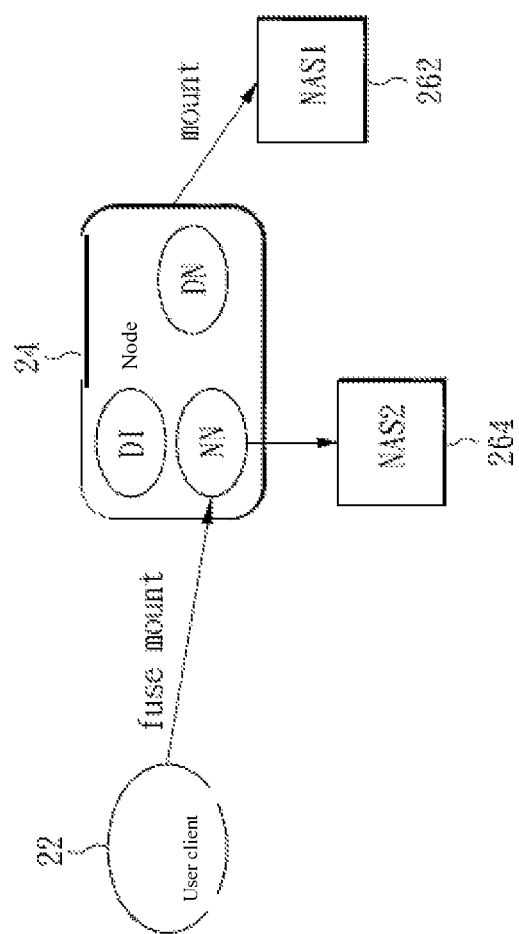
Figure 3:
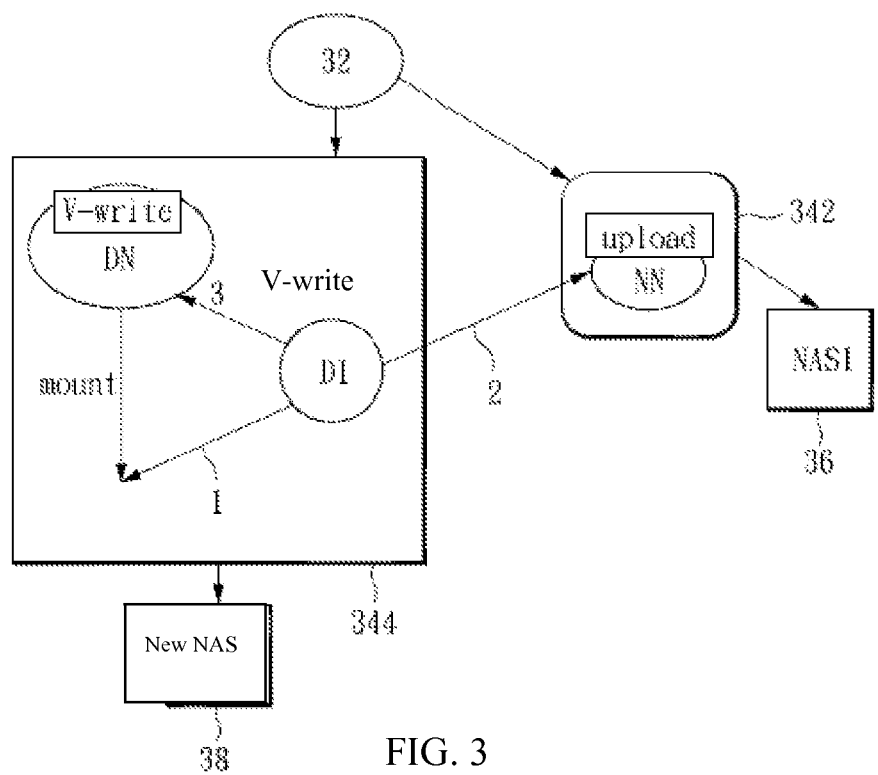
Figure 4:
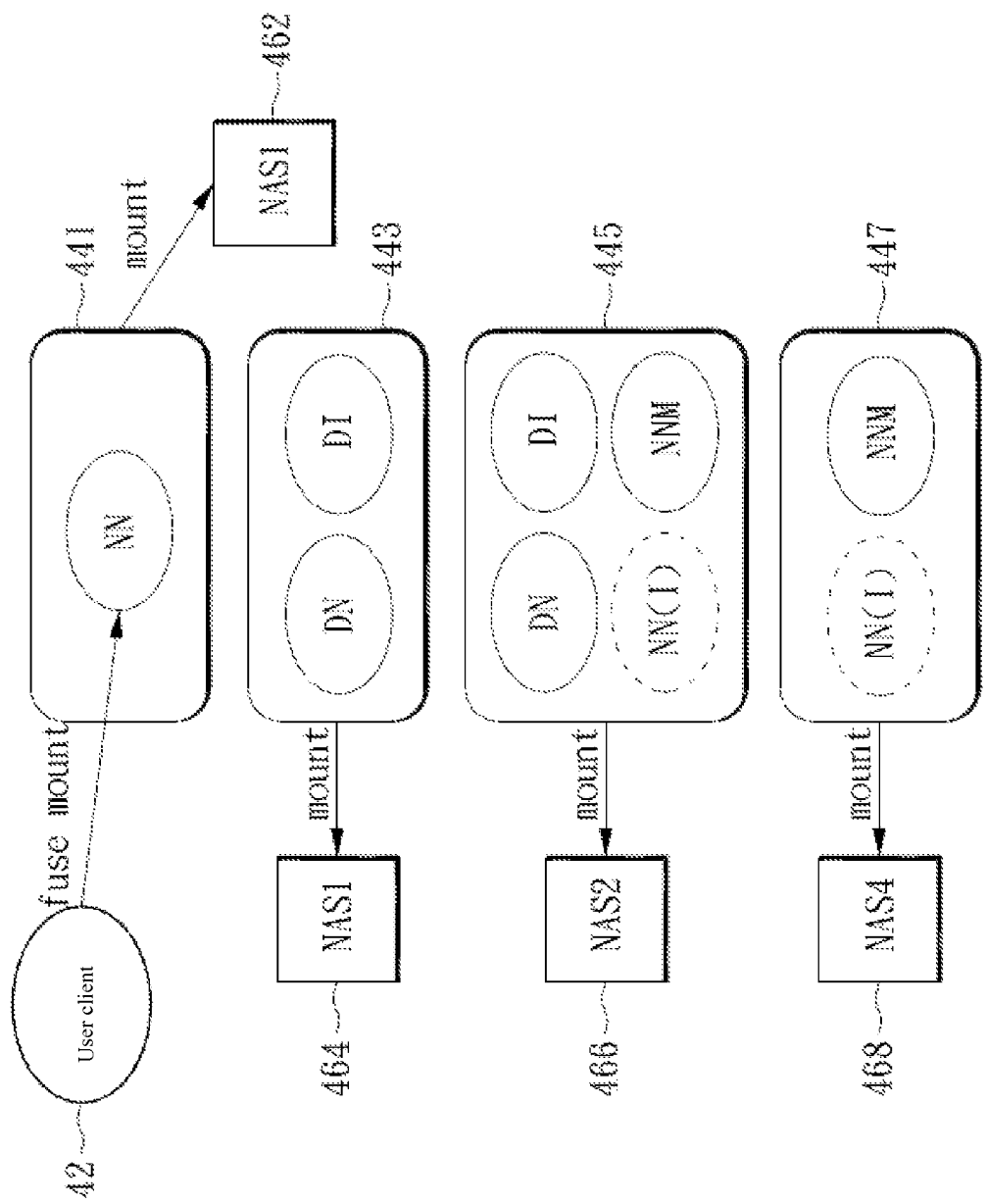
Figure 5:
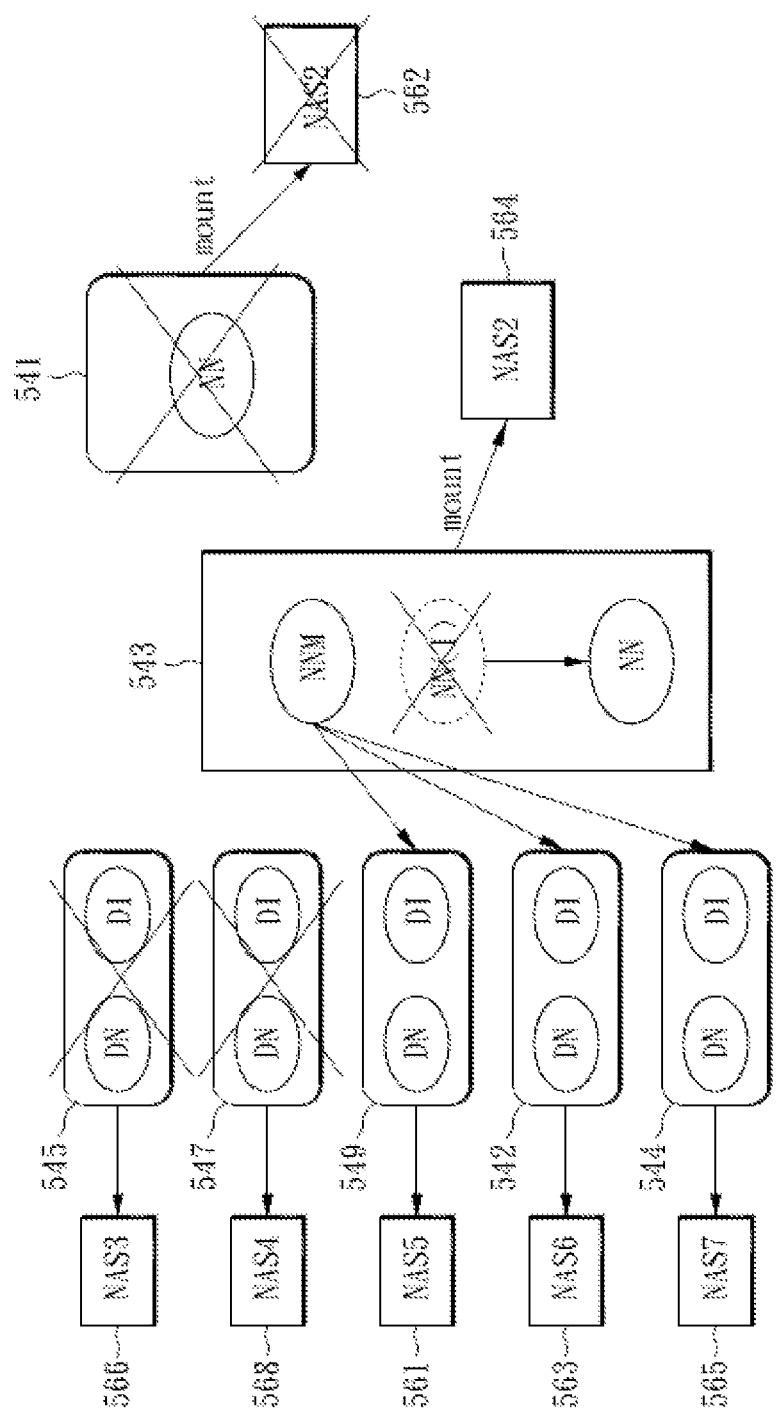
Figure 6:
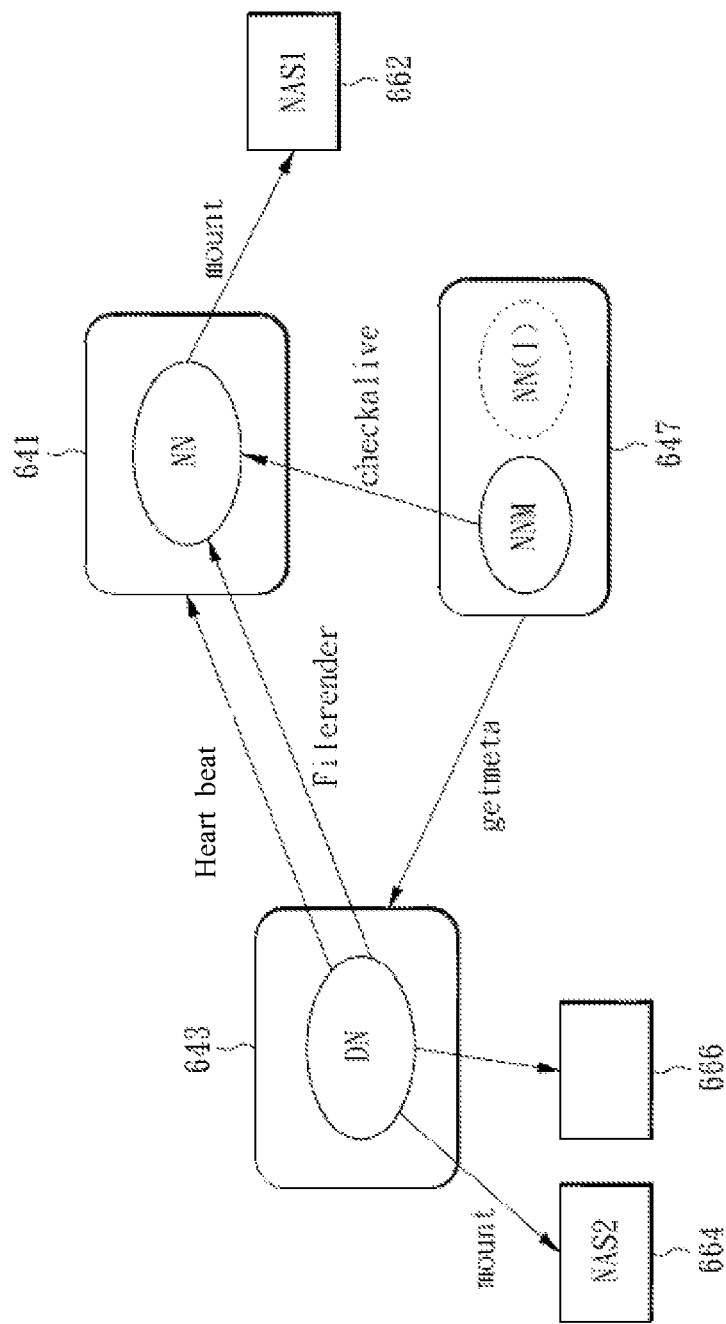
Figure 7:
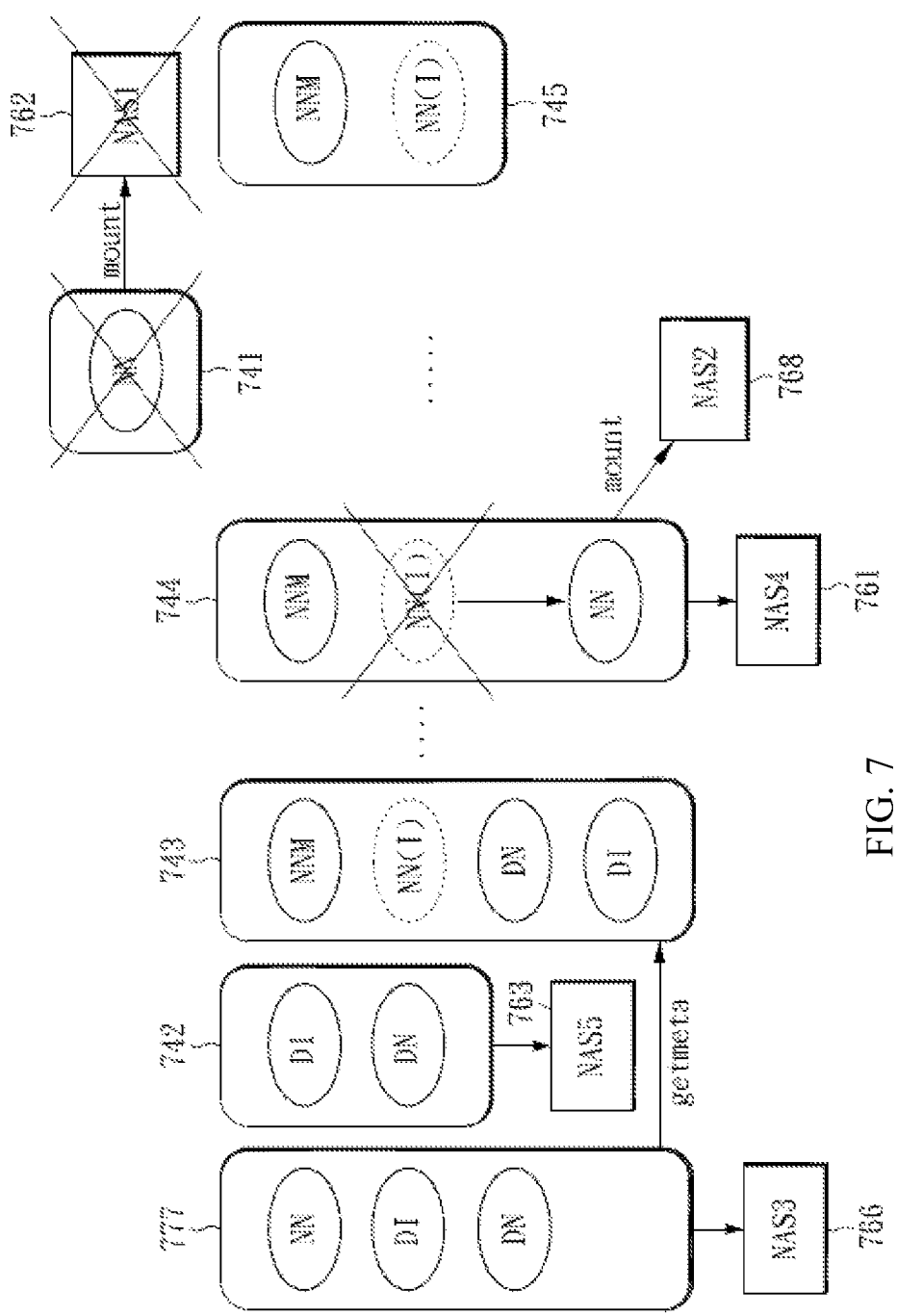
Figure 8A:
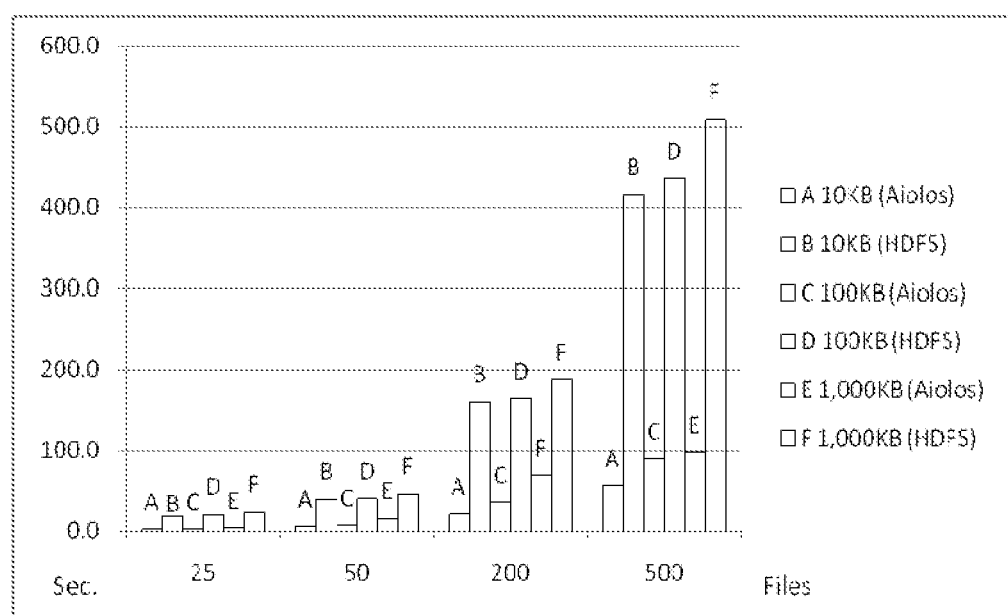

FIG. 1 discloses overall architecture according to a cloud data storage system 1 of invention;

FIG. 2 discloses basic architecture of a cloud data storage system 1 of one embodiment;

FIG. 3 discloses data import module operation;

FIG. 4 discloses NNM, NN(I) module operation;

FIG. 5 discloses cell recovery operation;

FIG. 6 discloses three nodes and based on this architecture describes how cell recovery undergoes;

FIG. 7 discloses more than three nodes and based on this architecture cell recovery undergoes;

FIG. 8a discloses comparison between the invention (Legend: Aiolos) under FIG. 4 architecture and current technology (Legend: HDFS), in respect of data migration time for different file numbers, different file sizes (Kb).

Figure 8B:
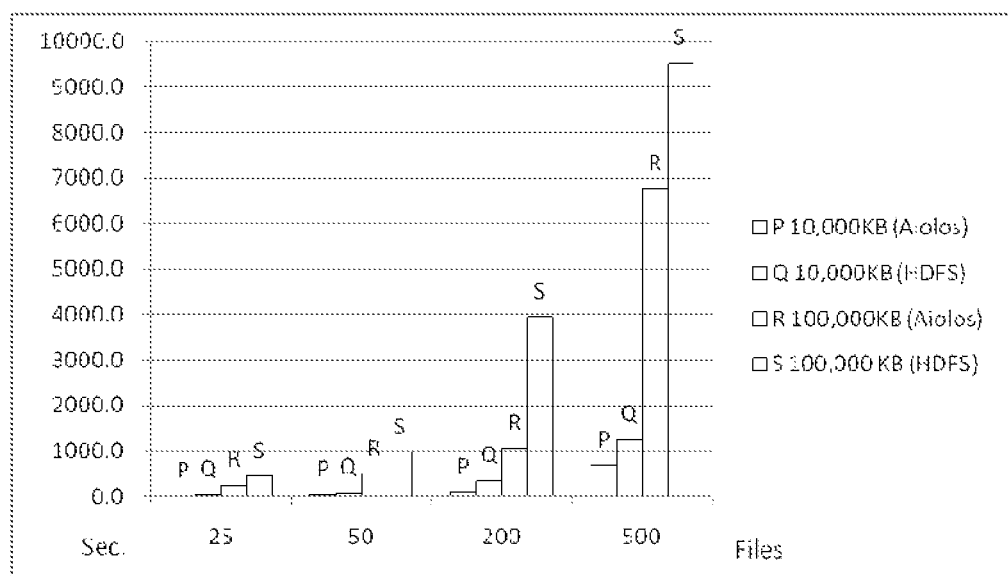

FIG. 8b discloses comparison between the invention (Legend: Aiolos) under FIG. 4 architecture and current technology (Legend: HDFS), in respect of cell recovery time for different file numbers, different file sizes (Kb).

DETAILED DESCRIPTION OF THE INVENTION

Some preferred embodiments and practical applications of this present invention would be explained in the following paragraph, describing the characteristics, spirit and advantages of the invention.

The followings first define the related terminologies used in the current invention.

The clustered files system is a system having plural physical files simultaneously mounted over plural server nodes and being shared and treated as a logical file system. The entire clustered files system has plural physical files system, but to clients in the cloud, it is a single logical file system.

The user_clients in cloud has hardware and/or software, and they depend on the application computational and storage capability in cloud to meet the needs. The user_clients, e.g., the desktop computer, smart phones and pad computer with some types of operating system (OS) and browsers.

The server in cloud has hardware and/or software, and they are designed to serve the needs of user_clients in cloud. The server might include multiple cores processor, cloud-specific operating system and their combination. The term of server has emphasized the role of service provider under client—server architecture. The standard file server a computer connecting to a network, the main function of this file server is to provide a location of shared disk space, for storing different types of data. This location can be accessed by all user_clients connected to the network. The file server does not have burden of computation, and also does not execute application programs for user_clients in the cloud. The file server includes PC or workstation hardware, running the network operating system (NOS), and coping with monitor, keyboard or mouse, and supporting controlled (access privileged) files sharing (e.g., Novell NetWare, UNIX® or Microsoft Windows). The mounted harddisk in the file server provides space of gigabytes, and can be mounted with tape drives to further expand the storage capacity.

Although client-server architecture is adopted, the network attached storage apparatus (NAS) is file-level storage apparatus (not a computer) connecting to the network. NAS provides files access service to heterogeneous user_clients, but NAS is not provided with monitor, keyboard or mouse. By configuration of hardware, software, and software/hardware, NAS performs specific function of storing files and service of files access. NAS is a network appliance, and is specially designed for files storage and file access, and it is not a general purpose standard file server. A single hardware, namely NAS gate (head or gateway), is used as an interface between NAS and user_client, and each NAS gate is assigned an IP address.

In general, NAS network appliance running embedded operating system, instead of full features network operating system. The NAS connected to the NAS gate has an IP address identical to IP address of NAS gate on the network (e.g., Ethenet).

In general, within NAS there are more than one harddisks that are configured as a logical, redundant storage apparatus or RAID array storage apparatus. As to access operation of NAS, among others, NFS, SMB/CIFS or AFP are some renowned network files sharing protocols. Since no monitor, keyboard, or mouse is locally provided with NAS, browser is usually used, via network connection, to manage or configure NAS.

The node in this invention is a device having an IP address, with processor capability, and the node might be connected to or might not be connected to a corresponding storage apparatus. The node device is selectively executing namenode module, datanode module, data import module, namenode monitor module which will be described later. As the result, the server device, user_client or NAS gate on the network, as long as it has IP address and processing capability, and selectively executing namenode module, datanode module, data import module, namenode monitor module, can be a node device in this invention.

《data files uploading》 or 《data files downloading》 in this invention means data files are moved and transferred from a physical location of storage apparatus to a physical location of another storage apparatus. If there is not real or actual movement and transfer or data files, it is not within the meaning of 《data uploading》 or 《data files downloading》 in this invention.

The module in this invention means software instruction sets which executes specific function. However if it is needed, it also is possible to achieve same module function with combination of hardware and software.

The namenode module (NNM) is a module for managing metadata of all data within the cloud data storage system, and this module can be executed on one or plural nodes for providing service to satisfy the metadata inquiry request from any user_client, and processes the file operations issued by user_client. The namenode module sends out data access instruction to access and maintain metadata of corresponding storage apparatus.

The datanode (DN) has function of datanode server. The datanode module is a module executing on one node or plural nodes, and each datanode module being executed can scan and access a corresponding storage apparatus connected to the datanode. Opposite to metadata, this storage apparatus is used to store original data files.

The data access instruction issued from namenode module, datanode module or user_client might be POSIX standard files access instruction (e.g., files access instruction after the harddisk has been mounted successfully) or non_POSIX standard files access instruction (e.g., put ˋ get commands of HDFS).

If it is a POSIX standard files access instruction, the mounting instruction executed may be selected from standard mounting instruction (Mount) of Linux system, Users Space files system (FUSE) mounting instruction, or Network-Attached Storage connection instructions of Windows system. Under Windows operating system, there is Network-Attached Storage connecting command, which can be used for connecting the shared file folder in other computers in the cloud data system running Windows operating system. This action of connecting Network-Attached Storage is similar to standard mounting instruction (Mount) of Linux system.

It is known that network files system (NFS) is standard communication protocol for network files system to exchange data. If the embodiment of invention is operated under Linux system, the NAS mounting issued from datanode is a mounting action of NFS to corresponding NAS over which NFS server module is running, and NFS client module is executed on datanode. The datanode must perform NFS mounting to NAS to establish connection for files transmission.

Another mounting instruction is User Space files system (FUSE) mounting. On the program of Users' Space, FUSE mounting provides a functional files system. As user_client uses non_Linux system files system, via Interrupt, FUSE mounting of Users Space to Linux Kernel will call a corresponding function in FUSE directory to emulate Linux command. Since actual practice of HDFS did not provide function of mounting Linux virtual files system, one can not use standard files access instruction for accessing data. However, the user_client still can use FUSE mounting to mount HDFS for files access purpose. Therefore as this invention is operated under HDFS architecture, the mounting from datanode to NAS is NFS mounting, and mounting from user_client to namenode module is FUSE mounting.

As shown in FIG. 1, the overall architecture of cloud data storage system 1 of the invention has plural nodes 14, each node 14 is mounted with at least one storage apparatus 15, 16. At least one user_client 12 may enter this cloud data storage system 1 and access the data files. If node 14 is a node executing namenode module, the corresponding storage apparatus is used for storing metadata of all primitive data in the cloud data storage system 1, and this type of storage apparatus is designated as the storage apparatus 15. The other storage apparatus not for storing metadata is that storing primitive data, and this type of storage apparatus is designated as storage apparatus 16. However, to save hardware resources, within the system 1, single storage apparatus may at the same time take responsibility of storing metadata and primitive data, if cell recovery is not a concern. It is not required that each node necessarily need at least one corresponding storage apparatus, the details of reason will be clear in the followings.

Data Import (or Data Migration)

In FIG. 2, basic architecture of a cloud data storage system 1 of preferred embodiment is shown. The cloud data storage system 1 includes following components: at least one node 24, over which datanode module (DN), namenode module (NN) and data import module (DI) are executed, and at least one storage apparatus NAS 262, for storing primitive data and the corresponding metadata. At least one user_client 22 may enter this cloud data storage system 1 to access the data files. As cost is not an issue, NAS can be replaced by higher cost of file server.

The datanode (DN) module has function of a datanode server. The datanode module is a module executed on one node or plural nodes 24, and each executing datanode module can scan and access data of a storage apparatus 262 connected to the corresponding node. Therefore the storage apparatus 262 may store primitive data. The namenode module (NN) is a module for managing metadata, which can be executed on one or plural nodes 24, for providing service to all metadata inquiry request of user_clients 22 in the cloud and processes file operations of user_clients 22. The namenode module (NN) issues data access instruction, to access and maintain metadata in the storage apparatus 262. Therefore, for the embodiment shown in FIG. 2, the storage apparatus 262 stores the primitive data and the metadata as well. If it is practiced under HDFS, user_client 22 uses FUSE mounting, and access data of node 24, the nodes 24 executing datanode module uses standard mounting instruction (Mount) or NFS mounting instruction to issue standard mounting instruction (Mount) to storage apparatus 262. As hardware cost or management cost is not a concern, the storage apparatus 262 might be a file server, and on the contrary, the storage apparatus 262 may be a network attached storage apparatus (NAS) without server capability, or may be a local harddisk connected to the node 24 executing datanode module (DN).

The data import module (DI) is executed on the node 24 on which a datanode module (DN) has been executed. The data import module scans a newly introduced storage apparatus 264 into the cloud data storage system 1 and obtains a corresponding files metadata, and after that, the data import module performs data import operation of storage apparatus 264 to the cloud data storage system 1 without proceeding data uploading. That is, the files or data are not actually moved or transferred.

Under the state of art for cloud data storage system, it is time consuming to import or integrate the network attached storage (NAS) 264 to the system 1 due to files are transferred actually to the storage system. This invention uses "link" for registering files system newly attached to the system 1 by linking the files on NAS 264 with the files of the system. On the other hand, by pure "link", one can assure the files structure of NAS 264 will not be damaged. The "link" has ways of softlink and hardlink. As the primitive data files have been deleted, their difference resides in: "softlink" can not open primitive files; but the hardlink still can open the primitive files. Permitting the user_client understand which files are produced or modified in the system is the first merit of softlink. The second merit of softlink is that after files on NAS 264 are deleted by user_client 22, any one on cloud data storage system 1 can not access the deleted files any longer.

FIG. 3 discloses a second embodiment and shows how data import module complete its operation. The cloud data storage system 1 includes the following components: a node 342 and another node 344. On node 342 a namenode module (NN) is executed, and on a node 344 a datanode module (DN) and data import module (DI) are executed. The NAS or file server 36 functions to store the primitive data and their corresponding metadata.

The data import module at least performs the following operations: (1) scanning NAS files system 38 newly introduced into the clustered cloud, (2) registering the metadata of the newly introduced NAS 38 to the node 342, (3) in respect to files of NAS 38 newly mounted to the node 344, performing "virtual write". As the data import operation is completed, the user_client (in FIG. 3, it is component 32) requests the namenode module (NN) to access files, and therefore is notified of the files address. Afterwards, the user_client 32 in FIG. 3 via datanode module (DN) of node 344 to access files. In addition, the namenode module (NN) also sets up the files replication strategy for cell recovery purpose. Node 344 executes read or write of files and executes the replication operation in accordance with the files replication strategy. The storage apparatus 36 may be selected from a group consisting of file server with server capability, network attached storage apparatus (NAS) without server capability, or local harddisk of node 344 executing the datanode module (DN).

From FIG. 3, it is known the datanode module (DN) needs assistance of data import module (DI) to accomplish data migration operation. The data migration includes two actions: registering metadata and data migration operation (without data uploading). The data migration operation (without data uploading) is also called as virtual write (V-write). The V-write is not limited to the way of "Link" and the possible alternatives include: 1. link, 2. changing of files path and files naming, 3. files partitions and files Rename, or 4. other similar ways.

As the invention is practiced under HDFS, V-write can be accomplished by "link" or "changing of files path and files naming". Using user_client of HDFS as example, the following steps are involved to get files. Firstly, HDFS user_client needs to request for information of files locations to namenode module (NN) as files access arises. The namenode module will investigate all files metadata within the node and notify the HDFS user_client of which datanodes storing the corresponding files. Secondly, HDFS user_client sends request for files to the datanode module holding the files. The datanode module will be responsible to locate the files and reply to HDFS user_client. HDFS datanode module will send all related files to a specific file folder within which all access operations undergo. Therefore, after metadata are registered into the namenode module (NN), the corresponding files can then be located and accessed in cloud data storage system. That is, the user_client 32 perceived the files have been actually uploaded and stored within the cloud data storage system 1. The establishment of link allows HDFS datanode module (DN) to locate the files and reply to HDFS user_client.

In summary, the data import task adopts registering files metadata to node executing namenode module (NN) and adding newly-connected files into the cloud data storage system without the actual data uploading. The data import operation may be one which links the newly-connected files into cloud data storage system, wherein the link is softlink or hardlink. The data import operation may be one which involves Rename of files to include the newly-connected files into the cloud data storage system.

Cell Recovery

The cell recovery is a fault tolerant technology which is aimed to recover the original system after the namenode malfunctions or the mounted NAS malfunctions. To implement this fault tolerant technology, each datanode in the invention stores a portion of metadata that correspond to data files stored in local datanode, as indicated by partial metadata 666 of FIG. 6. Every portions of metadata 666 are integrated together to become the files system metadata on active namenode module.

In FIG. 4, an advanced architecture for a cloud data storage system 1 of the invention is shown. The cloud data storage system 1 includes the following components: at least one node 441, 443, 445, 447, and at least four NASs (or file server instead) 462, 464, 466, 468. On the node 441, the active namenode module (NN) is executed, on the node 443 the datanode module (DN) and data import module (DI) are executed, on node 445 the datanode module (DN), data import module (DI), the inactive namenode module NN(I) and namenode monitor module (NNM) are executed, on the node 447 the inactive namenode module NN(I) and namenode monitor module (NNM) are executed. The details of function and operation of active namenode module (NN), datanode module (DN) and data import module (DI) can be referred to the corresponding iterations regarding FIG. 2 and FIG. 3.

One to plural namenode monitor modules (NNM) are respectively executed on one to plural nodes 445, 447, for monitoring health status of active namenode module (NN). As the active namenode module (NN) malfunctions, NNM wakes up an inactive namenode module NN(I) which may replace the role of malfunctioned active namenode module (NN). As recited above, the active namenode module (NN) processes file operations requested by user_client 42 and maintains files metadata of storage space 462. As the system 1 functions normally, the inactive namenode module (NN(I)) on the node 445, 447 are in inactive state which does not execute its full function. But if it is waken up by namenode monitor module (NNM), it will become another active namenode module (NN) of full capability.

In addition, namenode monitor module (NNM) will check periodically the metadata update records of data storage apparatus 462, and integrates it into files system FsImage, which is similar to secondary namenode module under HDFS architecture. Since only active namenode module (NN) can modify files metadata of storage space 462, it is easy to handle the files metadata synchronization in the system of this invention. The architecture of invention avoids system disability of prior technologies as active namenode module (NN) malfunctions. This is because of the inactive namenode module NN(I) being waken up to play the role of active namenode module (NN).

From FIG. 4, the namenode monitor module (NNM) will investigate periodically the health status of active namenode module (NN). As the active namenode module (NN) 441 malfunctions, namenode monitor module (NNM) will send message to all datanode (DN) and user_client 42, and allows an inactive namenode module NN(I) to wake up to play the role of original active namenode module (NN) 141.

On the node 445 or 447, it is required that namenode module (inactive) existing with namenode monitor module, to successfully wake up inactive namenode module as the active namenode 441 crashes. The data import module is selectively executed on the node 443, 445 over which datanode module is being executed. In other words, the datanode module may be executed alone on a node. The namenode monitor module (NNM) and datanode module (DN) exist on the same node 445 is one way to reduces the number of physical nodes, but this arrangement is not a requirement. It is not true that each node has to have all modules mentioned above, but for safety benefit, the five modules aforesaid prefer not to exist on the same node. The combinations of modules which must exist on the same node include: 1. "namenode monitor module+namenode module (inactive)" on the same node, 2. "datanode module+data import module" on the same node, and 3. All modules exist on the same node. In practice, namenode monitor module (NNM) may be executed on any node other than the namenode module (NN), for instance, any node executing the datanode module. As indicated in architecture of FIG. 2, 3 or 4. But datanode module can be executed alone at one node.

Under HDFS, Filesystem update recording files and metadata Editlog record all filesystem operations for the namenode. As some files are deleted or new files are added into the system, these operation records will be recorded into EDITLOG which can be stored on the local disk of the namenode or storage apparatus 462, and the contents recorded including operation timestamps, file metadata and additional information. The contents of EDITLOG are merged into FsImage periodically. At the moment of each merging, FsImage includes metadata for all files of the system, the metadata contents includes the file owners, file access privileges, the numbering of file_blocks and the datanode where the file block resides. This merging action is performed by namenode monitor module (NNM) periodically.

FIG. 5 shows embodiment of system including seven nodes 541, 543, 545, 547, 549, 542, 544, by which how cell recovery is performed is explained. In this FIG. 5, cross sign "x" over NN(I) does not mean malfunction, instead, it indicates NN(I) can be activated by NNM and becomes an active namenode module (NN). Other nodes 541, 545 or 547 or the storage apparatus 562 with cross sign on it however indicates malfunction. The module executed on each node is indicated in FIG. 5.

As recited above, the namenode monitor module (NNM) periodically inspects the health status of active namenode module (NN), and if active namenode module (NN) malfunctions, the inactive namenode module NN(I) will be waken up to play the role of active namenode module. Under this condition, the namenode monitor module (NNM) will send out messages notifying all health datanode (DN) 549, 542, 544, about the location change of namenode module (NN) (i.e., from node 541 switched to node 543). Afterwards, the system resumes to its normal operation.

If the active namenode module the mounted storage apparatus 562 malfunctions, the metadata will be lost. As the active namenode module (NN) is reset to execute, it will detect if metadata exists. If it is lost, the active NN will retrieve the corresponding metadata from each registering datanode, such as partial metadata 666 indicated in FIG. 6, for reconstructing the complete metadata, and store them into the operating storage apparatus 564.

FIG. 6 shows architecture of three nodes 641, 643, 647, by which how cell recovery is performed is explained. The module executed in each node is indicated in FIG. 6. The namenode monitor module (NNM) periodically uses checkAlive signal to inspect if the node 641 is alive. If malfunction of node 641 is detected, at the outset, NNM will inform all datanodes 643 of corresponding information of new namenode 647. After assuring that all datanodes have noted the location of new namenode 647, the new namenode module (NN(I)) is activated. The newly activated namenode module (NN(I)) has to inspect if files system FsImage exists during activation. If FsImage does not exist, NNM needs to retrieve metadata 666 from all datanodes using getMeta command which is a command for retrieving metadata. These metadata 666 are integrated into the required information. The heart_beat signal respectively sent by various node modules to the namenode module 641 indicating this node module still work normally. As the namenode 641 have not received this heart_beat signal for a predetermined times from a node, the namenode 641 considers malfunction of this node. The fileRender signal is a signal used by datanode module for reporting which files or files blocks are available in this datanode to the namenode 641. The fileRender signal will be sent to namenode periodically by datanode module, or at the time when the namenode 641 start at the first time or when namenode 641 resets to start.

FIG. 7 shows architecture of five nodes 741, 742, 743, 744, 745, by which how cell recovery is performed is explained. The module executed by each node is indicated in FIG. 7. The legend of "x" over NN(I) does not represent malfunction, instead, it means that NN(I) will become active due to activation of NNM. Node 741 or storage apparatus 762 when stamped with "x" indicates, however, malfunction. Node 777 is a node added to the system 1 by system administrator manually.

Within the cloud data storage system 1 of FIG. 7, at least one node, e.g., 743, 744, 745, of nodes 742, 743, 744, 745 executes the namenode monitor module (NNM). As node 741 which executes the active namenode module (NN) or/and the storage apparatus 762 malfunctions and can not recover, a namenode monitor module selects a new node 744 executing active namenode module (along with storage apparatus 768), replacing and executing the function of malfunctioned active namenode module 741 (or/and storage apparatus 762), from one of the healthy nodes (743, 744, 745) having inactive namenode module NN(I).

Referring to FIG. 7, the cloud data storage system 1 also allows the system administrator to add manually a new node 777 which executes the active namenode module (NN). As the node 741 executing active namenode module or/and the storage apparatus 762 malfunctions and can not recover, the system administrator may add manually the new node 777 executing active namenode module (NN) and the corresponding storage apparatus 766. The new node 777 executing active namenode module then sends out messages, reminding all nodes executing datanode module (DN), of the node changing information which executes the active namenode module. The new node 777 executing active namenode module uses a metadata retrieving signal (getMeta), to obtain all metadata (partial metadata) 666 from all nodes that still operating normally the datanode module, for reconstructing the entire files metadata, and start to provide file access service.

As recited above, each node in the invention executing datanode module stores a portion of metadata, this portion of metadata corresponds to the files of storage apparatus connected to the node executing the datanode module. In the cloud data storage system, if metadata are lost caused by malfunction of the first storage apparatus mounted to the node executing active namenode module, the active namenode module then executing cell recovery operation, by retrieving the related corresponding metadata from each node executing datanode module, to reconstructs the entire metadata. In the cloud data storage system, one of nodes executing datanode module executes a namenode monitor module. As node which executes the active namenode module (NN) or/and the storage apparatus malfunctions and can not recover, and a portion of nodes executing datanode module malfunctions, a namenode monitor module selects a new node executing active namenode module (along with storage apparatus), replacing and executing the function of malfunctioned active namenode module (or/and storage apparatus), from one of the healthy nodes having inactive namenode module NN(I).

Experiments for a prototype system constructed under the system architecture of FIG. 4 are disclosed in the following. The system includes four nodes (machines) shown in Table 1 and the comparison data of experiments for data migration and cell recovery are respectively shown in FIG. 8*a*, 8*b* for this invention (Legend: Aiolos) and for HDFS. The time of data migration is related to file amount and size of each file, and time of cell recovery relates to the file amount.

TABLE 1

|  | operating system | Memory Size | Harddisk space |
|---|---|---|---|
| active namenode 441 | Ubuntu | 512 MB | 20 G |
| inactive namenode 445 | Ubuntu | 512 MB | 20 G |
| datanode 443 | Ubuntu | 512 MB | 20 G |
| datanode 445 | Ubuntu | 512 MB | 20 G |
| user_client 42 | Ubuntu | 512 MB | 20 G |

From data of following Table 2 and 3, one can note that data migration time needed is about proportional to numbers of files and data of the invention outperform that of Hadoop system.

TABLE 2

(data migration data needed for this invention)

unit: sec

| No. of files | 10K (bytes) | 100K (bytes) | 1,000K (bytes) | 10,000K (bytes) | 100,000K (bytes) |
|---|---|---|---|---|---|
| 25 | 2.3116 | 2.1526 | 3.4252 | 27.5245 | 252.5467 |
| 50 | 5.2351 | 6.6585 | 16.049 | 47.5568 | 497.6244 |
| 200 | 21.6017 | 35.9638 | 69.0536 | 104.729 | 1054.6489 |
| 500 | 56.6106 | 89.297 | 97.2405 | 678.307 | 6780.307 |

TABLE 3

(data migration data needed for Hadoop system)

unit: sec

| No. of files | 10K (bytes) | 100K (bytes) | 1,000K (bytes) | 10,000K (bytes) | 100,000K (bytes) |
|---|---|---|---|---|---|
| 25 | 19.1 | 20.4 | 23.6 | 42.4 | 451 |
| 50 | 39.7 | 40.6 | 46.1 | 89.5 | 981 |
| 200 | 160.3 | 164.1 | 188.5 | 357.3 | 3951 |
| 500 | 415.6 | 435.4 | 508.2 | 1256.6 | 9523 |

In summary, the cloud data storage system architecture of the invention is valuable as reiterated above. The invention uses low cost NAS replacing conventional storage server for further lowering overall cost of setting up a cloud data storage system. The architecture is scalable since NAS may be added into or removed from the cloud data storage system seamlessly at any time. The metadata of entire system will be kept in active or inactive namenode module, and partial metadata of system are kept in all datanodes respectively. As active namenode module malfunctions or partial of metadata malfunctions, cell recovery can be performed for recovering the system.

With the example and explanations above, the features and spirits of the invention will be hopefully well described. It is understood that the invention is not only limited to those described embodiments and it is highly possible for persons skilled in the arts, without departing the spirit of the invention, might make various alteration, modification or equivalent transformation.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A cloud data storage system for multiple user_clients to access data of files over the cloud data storage system, comprising:
at least one node, each node being connected to a corresponding first storage apparatus for respectively storing metadata of and related only to each data of file stored on a corresponding second storage apparatus, and being connected to the corresponding second storage apparatus for respectively storing data of files;
at least two namenode modules, said namenode module having an active namenode module and at least one inactive namenode modules, the active namenode module being executed on one of said nodes for processing file operations issued by user_clients, the active namenode module issuing data access instruction for accessing and maintaining the metadata on the first storage apparatus;

at least one datanode module, being executed on one of said nodes, each datanode module functions to scan and access a corresponding second storage apparatus connected to the node on which said datanode module is executed, said each node executing the datanode module storing only a partial metadata, the partial metadata is metadata corresponding to data of file stored on the second storage apparatus of node executing the datanode module;

at least one namenode monitor module, being respectively executed on one of said nodes for monitoring health status of active namenode modules, and as the active namenode module malfunctions, the namenode monitor module wakes up inactive namenode module;

wherein as the first storage apparatus connected to the node executing the active namenode module malfunctions and metadata is lost, one of the inactive namenode modules module will be woken up to execute cell recovery operation and retrieve the partial metadata from each node executing the datanode module for reconstructing an entire data which corresponds to all available data of files in currently active datanodes.

2. The cloud data storage system of claim 1, wherein the second storage apparatus is selected from a group consisting of file server, network attached storage apparatus (NAS) without server capability, local harddisk of node executing datanode module.

3. The cloud data storage system of claim 1, wherein one of the nodes executing datanode module executes a namenode monitor module, and as the node executing active namenode module and the first storage apparatus both malfunction and cannot recover, the namenode monitor module selects, from nodes being under normal operation and having inactive namenode module, a new node executing active namenode module, and replaces and performs functions of the malfunction active namenode module.

4. The cloud data storage system of claim 1, wherein the data access instruction coping with a mounting instruction, the mounting instruction is selected from standard mounting instruction of Linux system, Users Space files system (FUSE) mounting instruction and connection instructions of Network-Attached Storage under Windows system.

5. The cloud data storage system of claim 1, wherein as the node executing active namenode module and the first storage apparatus both malfunction and cannot recover, and/or the node executing datanode module also malfunctions partially, a system administrator is allowed to include a new node executing active namenode module, the new node executing active namenode module issuing message notifying all nodes executing datanode module about node changes of executing active namenode module, the new node executing active namenode module providing services to all nodes executing datanode module normally by retrieving corresponding metadata from all nodes and reconstructing which corresponds to all available data of files in currently active datanodes.

* * * * *